(12) United States Patent
Kamimura et al.

(10) Patent No.: US 7,322,701 B2
(45) Date of Patent: Jan. 29, 2008

(54) PROJECTOR

(75) Inventors: Takashi Kamimura, Kanagawa (JP); Takehito Hiyoshi, Kanagawa (JP); Junichi Onodera, Kanagawa (JP)

(73) Assignee: Fujitsu General Limited, Kanagawa-Ken (JP)

( * ) Notice: Subject to any disclaimer, the term of this patent is extended or adjusted under 35 U.S.C. 154(b) by 250 days.

(21) Appl. No.: 11/217,461

(22) Filed: Sep. 2, 2005

(65) Prior Publication Data

US 2006/0050244 A1    Mar. 9, 2006

(30) Foreign Application Priority Data

Sep. 3, 2004  (JP)  ............................. 2004-257279
Jul. 5, 2005  (JP)  ............................. 2005-196688

(51) Int. Cl.
*G03B 21/14* (2006.01)

(52) U.S. Cl. ....................................... 353/69; 353/101
(58) Field of Classification Search ................ 353/69, 353/70, 101
See application file for complete search history.

(56) References Cited

U.S. PATENT DOCUMENTS 6,416,185 B1 * 7/2002 Smith ........................... 353/69
7,144,115 B2 * 12/2006 Li ................................. 353/31

FOREIGN PATENT DOCUMENTS

JP    2003-195416    7/2003

* cited by examiner

*Primary Examiner*—William C. Dowling
(74) *Attorney, Agent, or Firm*—McDermott Will & Emery LLP (57) ABSTRACT

To provide a projector having a configuration for reflecting correction by lens shift on keystone correction and preferentially using a lens shift function. The projector includes a keystone correcting portion for applying keystone correction to an input image signal, a display device for displaying an image in accordance with an output signal of the keystone correcting portion, a projection lens for projecting the image displayed on the display device to a screen, a lens driving portion for moving the projection lens and outputting the position information on the projection lens, and a control portion for outputting parameters used for keystone correction and the position information on the lens, in which the control portion determines whether the moving distance of the lens reaches a limit value, receives a keystone adjusting signal for changing the parameters used for keystone correction and receives a keystone adjusting signal for changing parameters used for keystone correction and outputs the signal only when the moving distance reaches the limit value.

10 Claims, 4 Drawing Sheets

PROJECTOR

TECHNICAL FIELD

The present invention relates to a projective projector for viewing an image reflected from a screen by setting the projector to the front of the screen and projecting the image to the screen.

BACKGROUND ART

A projective projector for viewing an image reflected from a screen by setting the projector to the front of a screen and projecting the image to the screen has been used so far as one type of projectors. In this case, it is preferable to set the projector so that the projective direction of the projector becomes vertical to the screen face so that the center of a projected image from the projector and the center of the screen are present on the same horizontal line and projective angles up to the upper and lower ends and right and left ends of the image displayed on the screen from the center of the projected image of the projector become equal to each other. However, because it is not always possible to set the projector to the front of the screen, a keystone corrective function serving as corrective means by image processing and lens shift function serving as corrective means by an optical system are used.

Figure 5:
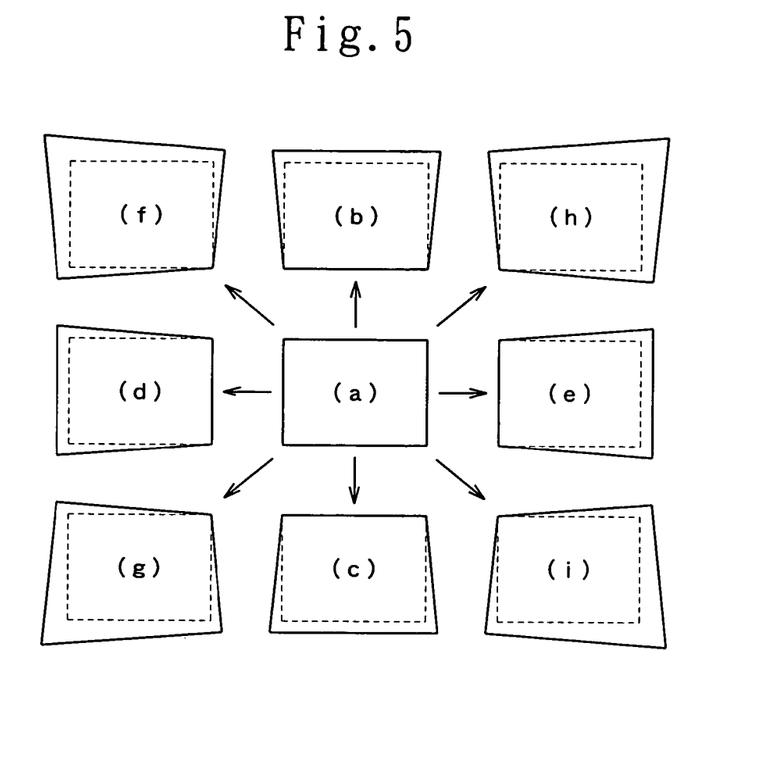
FIG. 5 is a schematic view for explaining a distortion of an image when projecting the image to a screen from a diagonal direction.

The keystone corrective function is a function for correcting a distortion generated when projecting an image to a screen from a diagonal direction. For example, when projecting an image to a screen from the front, an image area displayed on the screen becomes a rectangle shown in FIG. 5(a). When projecting the image to the screen in a diagonal direction from the downside, the image area becomes the trapezoid whose upper side is longer than the lower side as shown by a continuous line in FIG. 5(b) because of the different between distances up to the screen. When projecting the image to the screen in a diagonal direction from the upside, the area becomes the trapezoid whose lower side is longer than the upper side as shown in FIG. 5(c). When projecting the image to the screen in a diagonal direction from the right side, the area becomes the trapezoid as shown n FIG. 5(d). When projecting the image to the screen in a diagonal direction from the left side, the area becomes the trapezoid shown in FIG. 5(e). When projecting the imager to the screen from directions of right diagonal downside, right diagonal upside, left diagonal downside, and left diagonal upside, the area is displayed as deformed quadrangles such in FIGS. 5(f), 5(g), 5(h), and 5(i).

A function for correcting the distortion of an image is keystone correction. By changing enlargement-contraction rates in horizontal direction and/or vertical direction on a display device such as liquid crystal, performing adjustment so that a distortion on a screen and a distortion of an image area on the display device are canceled, and projecting a distorted image, it is possible to display the image as a rectangular image display area having a normal aspect ratio on the screen. The keystone correction can output a distorted quadrangle by correcting the quadrangle to the original rectangle when angles are kept in a certain range. However, the image quality is slightly deteriorated.

Figure 6:
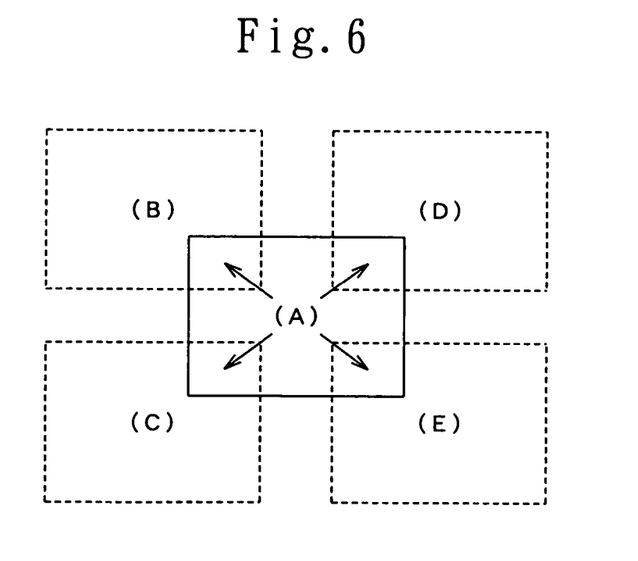
FIG. 6 is a schematic view for explaining a case of moving an image in parallel by using a lens shift function.

However, the lens shift function is a function for shifting an image display area displayed on a screen in parallel. As shown in FIG. 6, this shifts the position of an image on the screen by adjusting the position of a lens. For example, when assuming that an image area on the screen when the lens position is origin is the rectangular area shown in FIG. 6(A), it is possible to change display areas by parallel shift while keeping the size of the rectangle at the origin as shown in FIGS. 6(B) to 6(E) by adjusting the position of the lens. It is needless to say that adjustment can be made in all directions including not-illustrated vertical and horizontal directions. In the case of the correction by the lens shift function, though the moving area of an image on a screen is restricted because the working range of a lens is small, there is an advantage that the image quality is not deteriorated.

Thus, as correction means when using a projective projector, there are the keystone function serving as correction means by image processing and the lens shift function serving as correction means by an optical system. By properly using these correction means, it is possible to make correction to a rectangle having a normal aspect ratio.

However, when moving the image display area in parallel by the lens shift function in the right diagonal upper direction as shown in FIG. 6(D) and then diagonally projecting an image to a screen from the left diagonal downside, the image display area on the screen in this case is distorted differently from the case in which a lens is present at the origin position. Thus, even if trying to correct the distortion by keystone correction, correction to a rectangle having a normal aspect ratio cannot be made. That is, because the keystone corrective function and lens shift function are respectively independent functions, correction by one function is not reflected on correction by the other function. When correction cannot be made by using the lens shift function, it is necessary to perform keystone correction by once returning the lens up to the origin and projecting an image to the screen in a diagonal direction. Otherwise, correction to a rectangle having a normal aspect ratio cannot be made.

Moreover, when using the both functions, they cannot be used up to correction limits of the both. Therefore, unless they are used in a range narrower than their correctable ranges, correction to a rectangle having a normal aspect ratio cannot be made. That is, though a correctable range (angle) by the lens shift function and a correctable range (angle) by the keystone corrective function are respectively set, correctable ranges do not become the sum of angles even if using the both ranges. In fact, there is a problem that correction to a rectangle having a normal aspect ratio cannot be made by the keystone correction unless the correctable ranges are respectively used in a narrower range.

Because of the above problem, a projector in which the keystone corrective function serving as corrective means by image processing is matched with the lens shift function serving as corrective means by an optical system and correction by lens shift is reflected on keystone correction is desired and Patent Document 1 is already proposed to provide the projector.

[Patent Document 1] Japanese Patent Laid-Open No. 2003-195416

PROBLEMS TO BE SOLVED BY THE INVENTION

In this Patent Document 1, the following angles are used as parameters used for keystone correction (distortion correction): a horizontal gate angle Kx, vertical gate angle Ky, horizontal projection angle Tx to be changed by lens shift, and vertical projection angle Ty to be changed by lens shift and a point (x, y) on a screen before correction is converted into a point (x', y') on the screen after correction by the following expression.

$x' = x(\cos Kx - \sin Kx \cdot \tan Tx) - y(\tan Ky \cdot \tan Tx)$ $y' = x(\cos Ky - \sin Ky \cdot \tan Ty) - y(\tan Kx \cdot \tan Ty)$ In the case of this conversion expression, correction by leans shift is reflected on keystone correction. However, there is a problem that the point (x', y') on the screen after correction is changed to a quadratic curve characteristic as a gate angle increases and correction cannot be clearly made.

In the case of correction by the lens shift function, though the moving area of an image on a screen is restricted because the working range of a lens is small, there is an advantage that deterioration of image quality is small. Therefore, when correction can be made by lens shift to move the image to the center of a screen, it is preferable to use the lens shift function in preference to the keystone corrective function. Therefore, only when it is necessary to move the image more by the lens shift function more largely than a movable range, the image is projected to the screen from a diagonal direction and then, the image is corrected to a rectangle having a normal aspect ratio and thereby, deterioration of image quality can be minimized. However, the above Patent Document 1 does not refer to a method for using correction by the lens shift function and keystone correction or does not use a configuration for deciding working conditions of them. Therefore, there is a problem that a user applies keystone correction to a range which can be corrected by the lens shift function because the user does not discern the range.

DISCLOSURE OF THE INVENTION

The present invention is made to solve the above problems and its object is to provide a projector provided with computing means which can make correction to a rectangle having a normal aspect ratio by using a keystone function serving as correction means by image processing and a lens shift function serving as correction means by an optical system and a configuration for preferentially using correction by the lens shift function.

Claim 1 of the present invention is a projector comprising a keystone correcting portion for applying image processing by keystone correction to an input image signal, a display device for displaying an image in accordance with a signal output from the keystone correcting portion, a projection lens for projecting the image displayed on the display device to a screen by using the light from a light source, a lens driving portion for moving the projection lens and outputting the position information on the lens, and control portion for parameters used for keystone correction and the position information on the lens input from the lens driving portion, characterized in that the control portion determines from the input position information on the lens whether the moving distance of the lens reaches a limit value, receives a keystone adjusting signal for changing parameters used for keystone correction, and outputs the signal to the keystone correcting portion only when the moving distance of the lens reaches the limit value.

Claim 2 of the present invention is the projector according to claim 1, characterized in that the control portion determines from the input position information of the lens whether the moving distance of the lens reaches a limit value, selects an output from the keystone correcting portion when the distance reaches the limit value, and selects an input image signal when the distance does not reach the limit value.

Claim 3 of the present invention is the projector according to claim 1 or 2, characterized in that the control portion includes means for determining from the position information on a lens whether the moving distance of the lens reaches a limit value and means for outputting a signal for communicating that the moving distance does not reach the limit vale when a keystone adjusting signal for changing parameters used for keystone correction is input while the moving distance of the lens does not reach the limit value.

Claim 4 of the present invention is a projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens and outputting the position information on the lens, and control portion for outputting parameters used for keystone correction and the position information input from the lens driving portion to the keystone correcting portion, characterized in that the parameters used for the keystone correction are respectively obtained by assuming that the vertical gradient of a projection angle is θ, the horizontal gradient of the projection angle is θ, and the distance between the light source and the display device is l, and the distance between the light source and the screen is L, the position information of the lens output from the lens driving portion is obtained by assuming that the horizontal moving distance of the lens is Lx and the vertical moving distance of the lens is Ly, and the keystone correcting portion performs image processing according to keystone correction by using that a pixel position (x, y) on a display pixel and a display position (X, Y) on the screen have the relation of the following expression (1).

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where, $$A = \frac{L}{-(L_x + x)\sin\phi - (L_y + y)\cos\phi\sin\theta + l\cos\phi\cos\theta}$$

Claim 5 of the present invention is the projector according to any one of claims 1 to 3, characterized in that the parameters used for the keystone correction are respectively obtained by assuming that the vertical gradient of a projection angle is θ, horizontal gradient of the projection angle is φ, the distance between a light source and a display device is l, and the distance between the light source and a screen is L, positional information of a lens output from a lens driving portion is obtained by assuming that the horizontal moving distance of the lens is Lx and the vertical moving distance of the lens is Ly, and the keystone correcting portion performs image processing according to keystone correction by using that a pixel position (x, y) on the display device and a display position (X, Y) on the screen have the relation of the following expression (1).

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where,

-continued $$A = \frac{L}{-(L_x + x)\sin\phi - (L_y + y)\cos\phi\sin\theta + l\cos\phi\cos\theta}$$

Claim 6 of the present invention is a projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens, and a control portion for outputting parameters used for keystone correction and parameters for a lens moving distance to the keystone correcting portion, characterized in that the control portion determines from the parameters for the lens moving distance whether the moving distance of the lens reaches a limit value, receives a keystone adjusting signal for changing the parameters used for the keystone correction, and outputs the signal to the keystone correcting portion only when the moving distance of the lens reaches the limit value.

Claim 7 of the present invention is the projector according to claim 6, characterized in that the control portion determines from input parameters for a lens moving distance whether the moving distance of the lens reaches a limit value, selects an output from the keystone correcting portion when the moving distance reaches the limit value, and selects an input image signal when the moving distance does not reach the limit value.

Claim 8 of the present invention is the projector according to claim 6 or 7, characterized in that the control portion includes means for determining from parameters for a lens moving distance whether the moving distance of the lens reaches a limit value and means for outputting a signal for communicating that the moving distance of the lens does not reach the limit value when a keystone adjusting signal for changing parameters used for the keystone correction while the moving distance of the lens does not reach the limit value.

Claim 9 of the present invention is a projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens, and a control portion for outputting parameters used for keystone correction and parameters for a lens moving distance to the keystone correcting portion, characterized in that the parameters used for the keystone correction are respectively obtained by assuming that the vertical gradient of a projection angle is θ, the horizontal gradient of the projection angle is φ, the distance between the light source and the display device is l, and the distance between the light source and the screen is L, the parameters for the lens moving distance are respectively obtained by assuming that the horizontal moving distance of the lens is Lx and the vertical moving distance of the lens is Ly, and the keystone correcting portion performs image processing according to keystone correction by using that a pixel position (x, y) on the display device and a display position (X, Y) on the screen have the relation of the following expression (1).

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where, $$A = \frac{L}{-(L_x + x)\sin\phi - (L_y + y)\cos\phi\sin\theta + l\cos\phi\cos\theta}$$

Claim 10 of the present invention is the projector according to any one of claims 6 to 8, characterized in that parameters used for the keystone correction are respectively obtained by assuming that the vertical gradient of a projection angle is θ, the horizontal gradient of the projection angle is φ, the distance between a light source and a display device is l, the distance between the light source and a screen is L, parameters for a lens moving distance are respectively obtained by assuming that the horizontal moving distance of a lens is Lx and the vertical moving distance of the lens is Ly, and the keystone correcting portion performs image processing according to keystone correction by using that a pixel position (x, y) on the display device and a display position (X, Y) on a screen have the relation of the expression (1).

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where, $$A = \frac{L}{-(L_x + x)\sin\phi - (L_y + y)\cos\phi\sin\theta + l\cos\phi\cos\theta}$$

According to the invention of claim 1, the control portion includes means for determining from input position information of the lens whether the moving distance of the lens reaches the limit value so as to receive the lens shift adjusting signal and output the signal to the keystone correcting portion only when the moving distance of the lens reaches the limit value. Therefore, it is possible to preferentially use the correction according to lens shift and perform keystone correction for the first time when the moving distance of the lens reaches the light value. Therefore, it is possible to perform correction in which image quality is hardly deteriorated.

According to the invention of claim 2, the control portion determines from input lens position information whether the moving distance of the lens reaches the light value, selects the output from the keystone correcting portion when the moving distance reaches the limit value, and selects the input image signal when the moving distance does not reach the limit value. Therefore, it is possible to preferentially use the correction according to lens shift and perform keystone correction for the first time when the moving distance of the lens reaches the limit value. Therefore, it is possible to perform correction in which image quality is hardly deteriorated.

According to the invention of claim 3, the control portion includes means for determining from input lens position information whether the moving distance of the lens reaches the limit value and means for outputting the signal for communicating that the moving distance of the lens does not reach the limit value when the keystone adjusting signal for changing parameters used for keystone correction is input while the moving distance f the lens does not reach the limit value. Therefore, it is possible to communicate that the correction according to lens shift is still possible to a user.

According to the invention of claim 4, the keystone correcting portion can perform image processing according to keystone correction by using that the pixel position (x, y) on the display device and the display position (X, Y) on the screen have the relation of the expression (1). Therefore, it is possible to solve the problem of the prior art and perform parallel movement while keeping a normal aspect ratio even if performing correction to a rectangle having a normal aspect ratio in accordance with keystone correction and then moving an image in parallel by the lens shift function and moreover perform proper keystone correction even if a projection angle increases.

According to the invention of claim 5, the keystone correcting portion can perform image processing according to keystone correction by using that the pixel position (x, y) on the display device and the display position (X, Y) on the screen have the relation of the expression (1). Therefore, the problem of the prior art is solved and it is possible to perform parallel movement while keeping a normal aspect ratio even if moving an image in parallel by the lens shift function after performing correction to a rectangle having a normal aspect ratio in accordance with keystone correction and more over perform proper keystone correction even if a projection angle increases.

According to the invention of claim 6, the control portion includes means for determining from input parameters for the lens moving distance whether the moving distance of the lens reaches the limit value, receives the keystone adjusting signal, and outputs the signal to the keystone correcting portion only when the moving distance of the lens reaches the limit value. Therefore, the correction according to lens shift can be preferentially used and keystone correction can be made for the first time when the moving distance of the lens reaches the limit value. Therefore, it is possible to perform correction in which image quality is hardly deteriorated.

Moreover, because parameters for a lens moving distance used for operation of keystone correction are calculated from the lens moving distance input in accordance with an operation by a user, a conventional sensor for detecting a shift value becomes unnecessary and thereby, it is possible to reduce the load of control and the cost.

According to the invention of claim 7, the control portion determines from input parameters for a lens moving distance whether the moving distance of the lens reaches the limit value, selects an output from the keystone correcting portion when the moving distance reaches the limit value, and selects the input image signal when the moving distance does not reach the limit value. Therefore, the correction according to lens shift can be preferentially used and keystone correction can be made for the first time when the moving distance of the lens reaches the limit value. Therefore, it is possible to perform correction in which image quality is hardly deteriorated.

According to the invention of claim 8, the control portion includes means for determining from input parameters for an lens moving distance whether the moving distance of the lens reaches the limit value and means for outputting the signal for communicating that the moving distance of the lens does not reach the limit value when the keystone adjusting signal for changing the parameters used for keystone correction. Therefore, it is possible to communicate that correction according to lens shift is still possible to a user.

According to the invention of claim 9, the keystone correcting portion can perform image processing according to keystone correction by using that the pixel position (x, y) on the display device and the display position (X, Y) on the screen have the relation of the expression (1). Therefore, the problem of the prior art is solved and parallel movement can be made while keeping a normal aspect ratio even if moving the image in parallel by the lens shift function after performing keystone correction to make adjustment to a rectangle having the normal aspect ratio. Moreover, even if a projection angle increases, it is possible to perform proper keystone correction.

According to the invention of claim 10, the keystone correcting portion can perform image processing according to keystone correction by using that the pixel position (x, y) on the display device and the display position (X, Y) on the screen having the relation of the expression (1). Therefore, the problem of the prior art is solved and it is possible to perform parallel movement while keeping a normal aspect ratio even if moving an image in parallel by the lens shift function after performing keystone correction to make adjustment to a rectangle having the normal aspect ratio and moreover perform proper keystone correction even if a projection angle increases.

BEST MODE FOR CARRYING OUT THE INVENTION

A projector of the present invention is a projector comprising a keystone correcting portion for applying image processing according to keystone correction to an input image signal, a display device for displaying the image in accordance with a signal output from the keystone correcting portion, a projection lens for projecting the image displayed on the display device to a screen by using the light emitted from a light source, a lens driving portion for moving the projection lens and outputting position information on the lens, and a control portion for outputting parameters used for keystone correction and the position information on the lens input from the lens driving portion to the keystone correcting portion, characterized in the parameters used for keystone correction are respectively obtained by assuming that the vertical gradient of a projection angle is θ, the horizontal gradient of the projection angle is φ, and the distance between the light source and the display device is l, and the distance between the light source and the screen is L, the position information on the lens output from the lens driving portion is obtained by assuming that the horizontal moving distance of the lens is Lx and the vertical moving distance of the lens is Ly, and the keystone correcting portion performs image processing according to keystone correction by using that a pixel position (x, y) on the display device and a display position (X, Y) of the screen have the relation of the expression (1), and moreover the control portion includes means for determines from the input position information of the lens whether the moving distance of the lens reaches a limit value and means for outputting a signal for communicating that the moving distance of the lens does not reach the limit value when a keystone adjusting signal for changing the parameters used for keystone correction is input while the moving distance of the lens does not reach the limit value.

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where, $$A = \frac{L}{-(L_x + x)\sin\phi - (L_y + y)\cos\phi\sin\theta + l\cos\phi\cos\theta}$$

A projector of the present invention is described below in detail by referring to the accompanying drawings.

Embodiment 1

Embodiment 1 of the present invention is described below by referring to the accompanying drawings.

Figure 1:
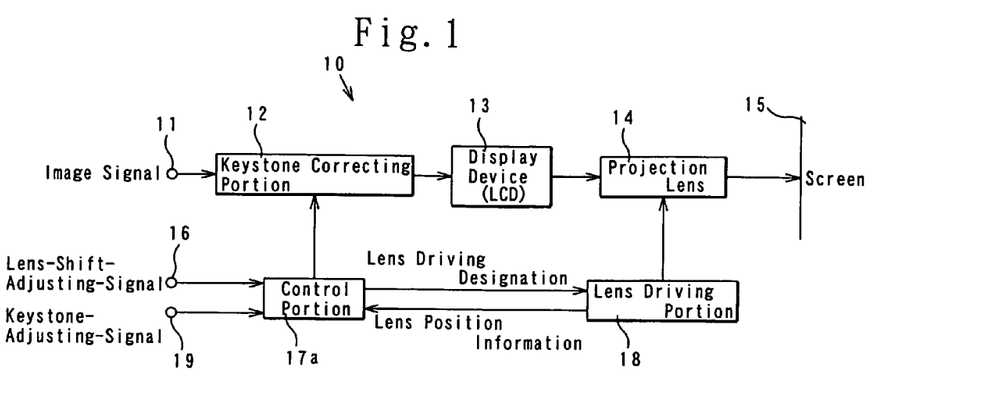
FIG. 1 is a block diagram showing a configuration of a projector 10 of the present invention.

FIG. 1 is a block diagram showing a configuration of the projector 10 of the present invention. In FIG. 1, an image signal input from an image signal input terminal 11 is input to a keystone correcting portion 12 to undergo necessary image processing and then output to a display device 13 at the rear stage. The display device 13 turns on a display portion designated through the image processing by the keystone correcting portion 12 and projects an image displayed on the display device 13 to a screen 15 by a not-illustrated light source and a projection lens 14 to display the image.

Moreover, the projector 10 of the present invention has a keystone corrective function, lens shift function, and zoom function. To perform their correction, correction is separately performed by operations by a user. In accordance with user's operation for performing lens shift, a lens shift adjusting signal is input to a control portion 17a from a lens-shift-adjusting-signal input terminal 16 and a keystone adjusting signal is input to the control portion 17a from a keystone-adjusting-signal input terminal 19 in accordance with a user operation for performing keystone correction. The control portion 17a performs the control for reflecting a parameter changed by an operation performed by a user in order to perform keystone correction on the keystone correcting portion 12, outputs a lens driving designation to a lens driving portion 18 to be described later in accordance with an operation performed by the user in order to perform lens shift, and performs the control for reflecting actual lens position information from the lens driving portion 18 on the keystone correcting portion 12 as one of parameters. The lens driving portion 18 changes the position of the projection lens 14 in accordance with the lens driving designation from the control portion 17a. The lens position after changed is immediately input to the control portion 17a.

Figure 3:
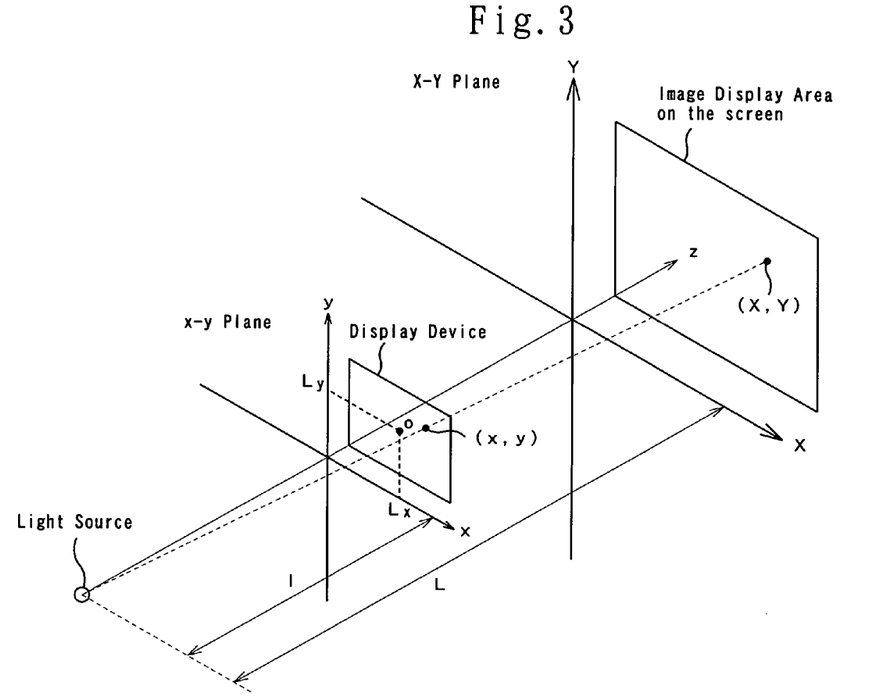
FIG. 3 is a schematic view for explaining various parameters for correction by an optical system of the present invention.

A parameter for lens position information input from the lens driving portion 18 when using the lens shift function among parameters controlled by the control portion 17a is described below in detail. In FIG. 3, an axis when the light from a light source is vertically projected to a plane provided with a screen is assumed as z axis, a plane on which the display device 13 is present is assumed as x-y plane, and a plane on which a screen is present is assumed as X-Y plane. When the projection lens 14 is present at the origin position, it is assumed that the center o of the display device 13 is overlapped with the center of x-y coordinates, and the lens shift function is used, the center o of the display device 13 is moved as shown in FIG. 3. In this case, the moving distance of the center o in x direction is assumed as Lx and the moving distance of the center o in y direction is assumed as Ly. Lx and Ly are parameters on the lens shift function. When a lens-shift adjusting signal from the lens-shift-adjusting-signal input terminal 16 is input to the control portion 17a in accordance with an operation by a user to perform lens shift, the control portion 17a outputs a lens driving designation to the lens driving portion 18. When the position of the lens is changed by the lens driving portion 18 in accordance with the lens driving designation, Lx and Ly are immediately input to the control portion 17a as lens position information.

Figure 4:
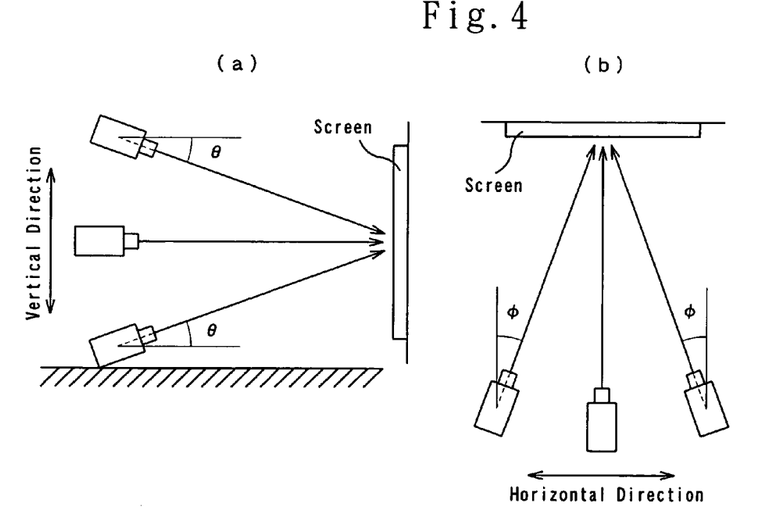
FIG. 4(a) is a schematic view for explaining a projection angle θ serving as a parameter for keystone correction.
FIG. 4(b) is a schematic view for explaining a projection angle φ serving as a parameter for keystone correction.

Then, a parameter to be input from the keystone-adjusting-signal input terminal 19 to the control portion 17a as a keystone adjusting signal in accordance with an operation by a user for performing keystone correction among parameters to be controlled by the control portion 17a is described below in detail. In this case, the fact that it is necessary to perform keystone correction represents that an image is projected to the screen from a diagonal direction. When a projection angle to the screen becomes clear, it is possible to accurately perform keystone correction. As shown in FIG. 4(a), it is assumed that a projection angle (vertical gradient) formed when projecting an image to a screen while moving the projector 10 in vertical direction is θ on the basis of a case of setting the projector 10 to the front of the screen. Moreover, as shown in FIG. 4(b), a projection angle (horizontal gradient) formed when projecting the image to the screen while moving the projector 10 in horizontal direction on the basis of a case of setting the projector 10 to the front of the screen is φ. These θ and φ are input to the control portion 17a as parameters for keystone correction. However, projection angles θ and φ are decided by adjustment values when a user determines that a correct aspect ratio is obtained by adjusting a distorted image while viewing it.

The projection angles θ and +serving as the parameters for the keystone correction and lens moving distances Lx and Ly serving as parameters for the lens shift function are input to the keystone correcting portion 12. Moreover, as shown in FIG. 3, when assuming that the distance from the light source up to the x-y plane including the display device 13 is l and the distance from the light source up to the X-Y plane including the screen 15 is L, values of these l and L are also input to the keystone correcting portion 12. It is allowed to automatically measure the value of L by setting a distance sensor, optionally set the value of L, or use a constant assuming a generally-used distance as the value of L. Moreover, the value of l is a parameter which is changed by zoom, which can be obtained from the following expression (2) by using the size of the display device, size of an image on the screen, and the distance L up to the screen.

$$\frac{L}{l} = \frac{\text{Size of image on screen}}{\text{Size of display device}} \quad (2)$$

$$\therefore l = L \cdot \frac{\text{Size of display device}}{\text{Size of image on screen}}$$

Then, the flow of image processing by the keystone correcting portion 12 is described below. When the coordinates (x, y) of an optional image on the display device 13 on the x-y plane in FIG. 3 is projected to the point (X, Y) on the screen 15, the relation between (x, y) and (X, Y) can be shown as follows by using the input parameters $\theta$, $\phi$, Lx, Ly, l, and L.

$$\begin{pmatrix} X \\ Y \end{pmatrix} = A \cdot \begin{pmatrix} (L_x + x)\cos\phi - (L_y + y)\sin\phi\sin\theta + l\sin\phi\cos\theta \\ (L_y + y)\cos\theta + l\sin\theta \end{pmatrix} \quad (1)$$

Where, $$A = \frac{L}{-(L_x + x)\sin\phi - (L_y + y)\cos\phi\sin\theta + l\cos\phi\cos\theta}$$

According to the above expression (1), it is possible to compute a place to which an optional pixel (x, y) on the display device 13 is projected. Therefore, by using the expression (1), coordinates when four apexes of the display device 13 on the x-y plane are projected onto the screen 15 are calculated. When four apexes are diagonally project to the screen 15, four apexes of the display device 13 form a quadrangle on the screen 15 on the X-Y plane. It is possible to select rectangular areas respectively having a normal aspect ratio shown by broken lines in FIG. 5(*b*) to 5(*i*) in the quadrangle. For four vertexes of each of the selected rectangles respectively having a normal aspect ratio, coordinates of four vertexes of four rectangles on the display pixel 13 are obtained by calculating the above expression (1) backward. Four points of each of the rectangles form a quadrangle. By deforming an input image signal so as to be fitted into the distorted quadrangle and inversely, projecting the quadrangle, it is possible to display an image on the screen 15 as a rectangle having a normal aspect ratio.

Thus, an image signal input from the image signal input terminal 11 decides a pixel to be turned on the display device 13 in accordance with the relation shown by the above expression (1) in the keystone correcting portion 12. Parameters $\theta$ and $\phi$ for keystone correction which is correction by image processing, parameters Lx and Ly for the lens shift function which is correction by an optical system, parameters l and L for the zoom function are reflected on the expression (1). When performing any one of these corrections, parameters for the correction area immediately reflected on the expression (1) of the keystone correcting portion through the control portion 17*a*.

Moreover, in the case of the present invention, because parameters for all corrective functions are reflected on the expression (1), it is possible to correct an image to a rectangle having a normal aspect ratio even if both the keystone correction and the correction by the lens shift function are used together. Furthermore, because the characteristic does not become a quadratic curve differently from the case of the operational expression in Patent Document 1, it is possible to always perform proper correction independently of the magnitude of a projection angle.

Furthermore, even if a correctable range (angle) according to the lens shift function and the correctable range (angle) according to the keystone corrective function are set in the prior art, when these functions are independent each other, the correctable ranges do not become the sum of angles even if using the both functions and the both functions can be used in a narrower range. However, in the case of the present invention, because corrective functions are matched by reflecting parameters for all corrective functions on the expression (1), up to an angle almost coinciding with the sum of angles can be corrected.

Embodiment 2

Figure 2:
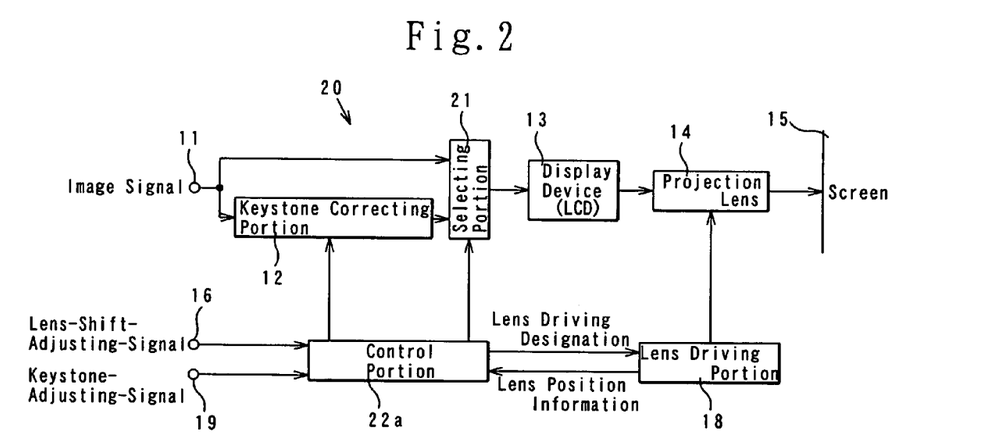
FIG. 2 is a block diagram showing a configuration of a projector 20 of embodiment 2 of the present invention.

As described for the embodiment 1, it is possible to match the keystone correction which is correction means by image processing with the lens shift which is correction means by an optical system by constituting the projector 10 like the embodiment 1. However, as described above, though keystone correction is followed by deterioration of image quality to a certain extent, image quality is hardly deteriorated in the case of correction by lens shift. Therefore, it is preferable to preferentially use the correction by lens shift. Therefore, in the case of the embodiment 2, the projector 20 is constituted as shown in FIG. 2 so that keystone correction can be made only after correction by lens shift is performed up to limit. In FIG. 2, a component having the same configuration as that in FIG. 1 is provided with the same number and its description is omitted.

In FIG. 2, an image signal from the image signal input terminal 11 and an output signal in which image processing is applied to an image signal from the image signal input terminal 11 are input to a selecting portion 21 and a signal for selecting either of two signals input from a control portion 22*a* is input to the selecting portion 21. The control portion 22*a* determines from input position information of a lens whether the moving distance of the lens reaches a limit value. When the moving distance reaches the limit value, the control portion 22*a* selects an output from the keystone correcting portion but when the moving distance does not reach the limit value, outputs a signal for selecting the input image signal to the selecting portion. When a selection signal when the moving distance of the lens is equal to or less than the limit value is input, the selecting portion 21 outputs an image signal to the display device 13 at the rear stage but when a selection signal when the moving distance of the lens reaches the limit value is input, outputs an output of the keystone correcting portion 12 to the display device 13 at the rear stage.

By using the above configuration, keystone correction cannot be made as long as correction by lens shift does not reach the limit value or even if performing keystone correction, it is impossible to reflect the keystone correction on image display on the screen 15. A user can preferentially use the correction by lens shift which is a correction method in which image quality is hardly deteriorated. In the case of the embodiment 2, an output is selected by setting the selecting portion 21. However, the same advantage can be obtained without setting the selecting portion 21 by determining whether each of the lens moving distances Lx and Ly is a limit value in the control portion 17*a* having the configuration in FIG. 1, receiving a keystone signal from the keystone-adjusting-signal input terminal 19 for the control portion 17*a* only when each of the moving distances reaches the limit value, and outputting $\theta$ and +as parameters for keystone correction.

Embodiment 3

The embodiments 1 and 2 are respectively constituted by changing positions of the lens driving portion 18 by the lens driving portion 18 in accordance with a lens driving designation from the control portion 17a and detecting and inputting the changed lens position to the control portion 17a to use the changed lens position for keystone correction by the keystone correcting portion 12. However, the present invention is not restricted to the above case. For example, instead of detecting the lens position and feed back the position to the control portion 17a, it is also allowed to store a lens moving distance in the control portion 17a.

Figure 7:
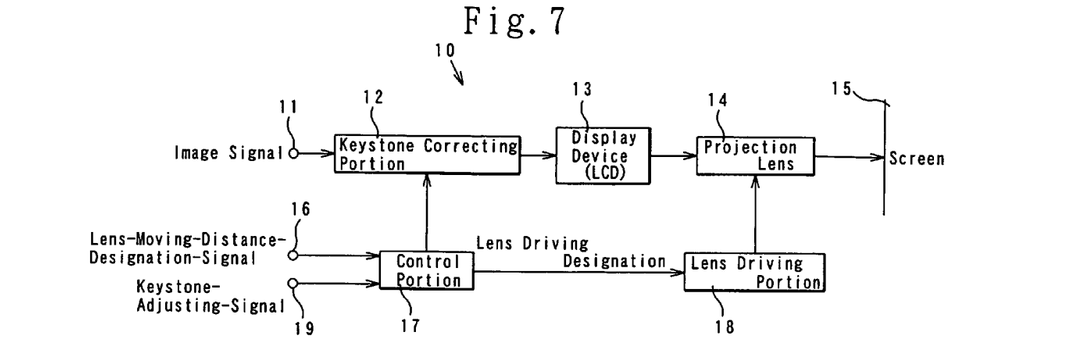
FIG. 7 is a block diagram showing a configuration of a projector 10 of embodiment 3 of the present invention.

FIG. 7 is a block diagram showing a configuration of the projector 10 in the embodiment 3. In FIG. 7, a component having the same configuration as that in FIG. 1 is provided with the same symbol as FIG. 1 and its description is omitted. In FIG. 7, a lens moving-distance designation signal is input from the lens-moving-distance-designation-signal input terminal 16 to a control portion 17b, the control portion 17b performs the control for reflecting a parameter changed through an operation performed by a user to perform keystone correction on the keystone correcting portion 12, outputs a lens-moving-distance designation signal according to an operation performed by the user to a lens driving portion 18 to be described later, and performs the control for calculating a moved lens position by using the lens-moving-distance designation signal and reflecting the lens position on the keystone correcting portion 12. The lens-moving-distance designation signal is the same signal as the lens shift adjusting signal used for the embodiments 1 and 2. Therefore, in the case of this embodiment, another expression is only used for the signal in order to designate only a moving distance but it is not essentially different.

The parameter for a lens moving distance to be controlled by the control portion 17b is described below. As shown in FIG. 3, the center o of the display device 13 is relatively moved when the lens moves. The moving distance of the lens in x direction to the reference point in this case (for example, center o of the display device 13) is assumed as Lx and the moving distance of the lens in y direction is assumed as Ly. The Lx and Ly are parameters for the lens shift function, the Lx and Ly are generated in accordance with a lens-moving-distance designation signal from the lens-moving-distance-designation-signal input terminal 16 and stored in the control portion 17b.

In this case, when assuming lens moving distances designated by a lens-moving-distance-designation-signal newly input to the control portion 17b from the lens-moving-distance-designation-signal input terminal 16 as Lx' and Ly', the control portion 17b outputs a lens moving designation to the lens driving portion 18, obtains the sum of the stored moving distances Lx and Ly and the new moving distances Lx' and Ly', and newly stores the sum as a lens moving distance. When showing these moving distances by expressions, the following expressions are obtained: Lx=Lx–Lx' and Ly=Ly–Ly' (in this case, "=" represents substitution). These operations are executed whenever lens shift is performed.

A lens-moving-distance-designation-signal input from the lens-moving-distance-designation-signal input terminal 16 is output in accordance with an operation of the body or remote controller by a user. For example, the time while pressing an operation key is sampled every certain period and output, computed by the control portion 17b every time, and stored.

In the case of this embodiment, the lens driving portion 18 only moves a lens in accordance with a lens driving designation from the control portion 17b but a mechanism for detecting a lens position is not set to the lens driving portion 18. Instead of setting the position detecting mechanism, a lens moving distance to a reference point is always stored in the control portion 17b and thereby the present lens position is confirmed to perform proper keystone correction.

As described above, even if the moving distance of a lens is stored in the control portion 17b without setting a lens position detecting mechanism, it is possible to perform correction to a rectangle having a normal aspect ratio by reflecting parameters for all corrective functions on the expression (1) and correcting them similarly to the case of the embodiments 1 and 2 even when using corrections by the keystone corrective function and lens shift function together. Moreover, because a parameter for a lens moving distance used for the operation of keystone correction is calculated from a lens-moving-distance designation signal, a sensor for detecting a lens position is unnecessary and thereby, it is possible to reduce the burden of control and the cost.

Embodiment 4

Figure 8:
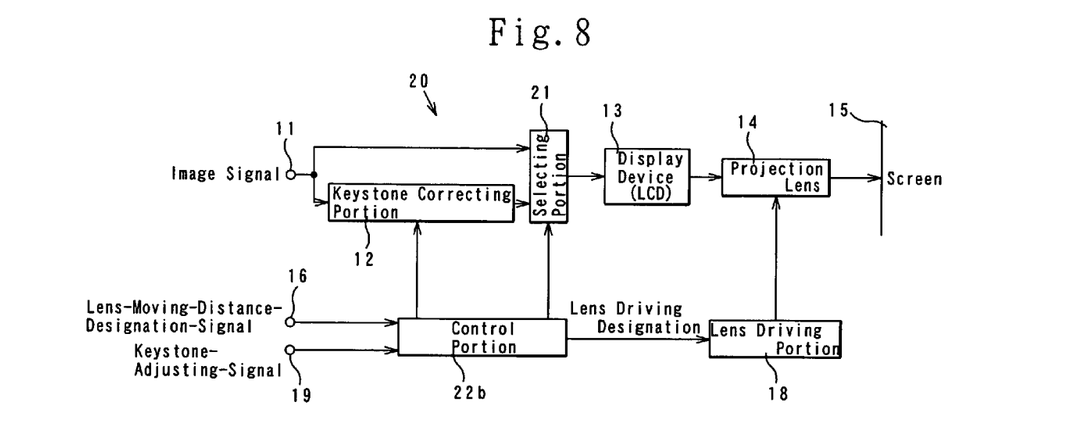
FIG. 8 is a block diagram showing a configuration of a projector 20 of embodiment 4 of the present invention.

By constituting the projector 10 like the embodiment 3, it is possible to match keystone correction which is correction means by image processing with lens shift which is correction means by an optical system and moreover, a sensor for detecting a lens position is unnecessary. Therefore, it is possible to reduce the burden of control and the cost and moreover, it is allowed that keystone correction can be made only after the correction by lens shift is performed up to limit by using the configuration shown in FIG. 8 similarly to the case of the embodiment 2. In FIG. 8, a component having the same configuration as that in FIG. 2 is provided with the same number and its description is omitted.

In FIG. 8, an image signal from the image signal input terminal 11 and an output signal in which image processing is applied to the image signal from the image signal input terminal 11 by the keystone correcting portion are input to the selecting portion 21 and a signal for selecting either of two input signals is input to the selecting portion 21 from a control portion 22b. The control portion 22b determines from the generated information on a lens moving distance whether the lens moving distance reaches a limit value. When the moving distance reaches the limit value, the control portion 22b selects an output from the keystone correcting portion. When the moving distance does not reach the limit value, the control portion 22b outputs a signal for selecting the input image signal to the selecting portion. When a selection signal when the lens moving stance is equal to or less than the limit value is input, the selecting portion 21 outputs an image signal to the display device 13 at the rear stage. When a selection signal when the lens moving distance reaches the limit value is input, the selecting portion 21 outputs an output of the keystone correcting portion 12 to the display device 13 at the rear stage.

By using the above configuration, keystone correction cannot be made as long as the correction by lens shift does not reach the limit value or even if performing the keystone correction, it cannot be reflected on image display on the screen 15 and a user can preferentially use the correction by lens shift which is a correction method in which image quality is hardly deteriorated. In the case of this embodiment 3, an output is selected by setting the selecting portion 21. The same advantage can be obtained by determining whether each of the lens moving distances Lx and Ly is a limit value by the control portion 17b in the configuration in FIG. 7 and receiving a keystone adjusting signal from the keystone-adjusting-signal input terminal 19 for the control portion 17b only when each of the lens moving distances Lx and Ly reaches the limit value so as to output the received θ and φ serving as parameters for keystone correction to the keystone correcting portion 21.

The above embodiment 2 or 4 is constituted so that advantage of correction according to keystone correction cannot be reflected on an image. However, the present invention is not restricted to the above case. For example, to perform keystone correction while correction by lens shift does not reach a limit value, it is allowed to use a configuration for calling user's attention. In this case, it is possible to use a method for calling user's attention by determining whether each of the lens moving distances Lx and Ly is a limit value by the control portion 17b (22b) and performing a display on a liquid-crystal display portion for operations in accordance with an instruction from the control portion 17b (22b) when performing keystone correction in a state of a not limit value.

The invention claimed is:

1. A projector comprising a keystone correcting portion for applying image processing by keystone correction to an input image signal, a display device for displaying an image in accordance with a signal output from the keystone correcting portion, a projection lens for projecting the image displayed on the display device to a screen by using the light from a light source, a lens driving portion for moving the projection lens and outputting the position information on the lens, and control portion for parameters used for keystone correction and the position information on the lens input from the lens driving portion, characterized in that the control portion determines from the input position information on the lens whether the moving distance of the lens reaches a limit value, receives a keystone adjusting signal for changing parameters used for keystone correction, and outputs the signal to the keystone correcting portion only when the moving distance of the lens reaches the limit value.

2. The projector according to claim 1, characterized in that the control portion determines from the input position information of the lens whether the moving distance of the lens reaches a limit value, selects an output from the keystone correcting portion when the distance reaches the limit value, and selects an input image signal when the distance does not reach the limit value.

3. The projector according to claim 1 or 2, characterized in that the control portion includes means for determining from the position information on a lens whether the moving distance of the lens reaches a limit value and means for outputting a signal for communicating that the moving distance does not reach the limit vale when a keystone adjusting signal for changing parameters used for keystone correction is input while the moving distance of the lens does not reach the limit value.

4. A projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens and outputting the position information on the lens, and control portion for outputting parameters used for keystone correction and the position information input from the lens driving portion to the keystone correcting portion, characterized in that the parameters used for the keystone correction are respectively obtained by assuming that the vertical gradient of a projection angle is θ, the horizontal gradient of the projection angle is φ, and the distance between the light source and the display device is 1, and the distance between the light source and the screen is L, the position information of the lens output from the lens driving portion is obtained by assuming that the horizontal moving distance of the lens is Lx and the vertical moving distance of the lens is Ly, and the keystone correcting portion performs image processing according to keystone correction by using that a pixel position (x, y) on a display pixel and a display position (X, Y) on the screen have the relation of the following expression (1)

$$\begin{pmatrix} X \\ Y \end{pmatrix} = A \cdot \begin{pmatrix} (L_x + x)\cos\phi - (L_y + y)\sin\phi \sin\theta + l\sin\phi \cos\theta \\ (L_y + y)\cos\theta + l\sin\theta \end{pmatrix} \quad (1)$$

Where, $$A = \frac{L}{-(L_x + x)\sin\phi - (L_y + y)\cos\phi \sin\theta + l\cos\phi \cos\theta}.$$

5. The projector according to claim 1 or 2, characterized in that the parameters used for the keystone correction are respectively obtained by assuming that the vertical gradient of a projection angle is θ, horizontal gradient of the projection angle is φ, the distance between a light source and a display device is 1, and the distance between the light source and a screen is L, positional information of a lens output from a lens driving portion is obtained by assuming that the horizontal moving distance of the lens is Lx and the vertical moving distance of the lens is Ly, and the keystone correcting portion performs image processing according to keystone correction by using that a pixel position (x, y) on the display device and a display position (X, Y) on the screen have the relation of the following expression (1)

$$\begin{pmatrix} X \\ Y \end{pmatrix} = A \cdot \begin{pmatrix} (L_x + x)\cos\phi - (L_y + y)\sin\phi \sin\theta + l\sin\phi \cos\theta \\ (L_y + y)\cos\theta + l\sin\theta \end{pmatrix} \quad (1)$$

Where, $$A = \frac{L}{-(L_x + x)\sin\phi - (L_y + y)\cos\phi \sin\theta + l\cos\phi \cos\theta}.$$

6. A projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens, and a control portion for outputting parameters used for keystone correction and parameters for a lens moving distance to the keystone correcting portion, characterized in that the control portion determines from the parameters for the lens moving distance whether the moving distance of the lens reaches a limit value, receives a keystone adjusting signal for changing the parameters used for the keystone correction, and outputs the signal to the keystone correcting portion only when the moving distance of the lens reaches the limit value.

7. The projector according to claim 6, characterized in that the control portion determines from input parameters for a lens moving distance whether the moving distance of the lens reaches a limit value, selects an output from the keystone correcting portion when the moving distance reaches the limit value, and selects an input image signal when the moving distance does not reach the limit value.

8. The projector according to claim 6 or 7, characterized in that the control portion includes means for determining from parameters for a lens moving distance whether the moving distance of the lens reaches a limit value and means for outputting a signal for communicating that the moving distance of the lens does not reach the limit value when a keystone adjusting signal for changing parameters used for the keystone correction while the moving distance of the lens does not reach the limit value.

9. A projector comprising a keystone correcting portion for applying image processing according to keystone correction to an input image signal, a display device for displaying an image in accordance with a signal output from the keystone correcting portion, a projection lens for projecting the image displayed on the display device to a screen by using the light emitted from a light source, a lens driving portion for moving the projection lens, and a control portion for outputting parameters used for keystone correction and parameters for a lens moving distance to the keystone correcting portion, characterized in that the parameters used for the keystone correction are respectively obtained by assuming that the vertical gradient of a projection angle is $\theta$, the horizontal gradient of the projection angle is $\phi$, the distance between the light source and the display device is 1, and the distance between the light source and the screen is L, the parameters for the lens moving distance are respectively obtained by assuming that the horizontal moving distance of the lens is Lx and the vertical moving distance of the lens is Ly, and the keystone correcting portion performs image processing according to keystone correction by using that a pixel position (x, y) on the display device and a display position (X, Y) on the screen have the relation of the following expression (1)

$$\begin{pmatrix} X \\ Y \end{pmatrix} = A \cdot \begin{pmatrix} (L_x + x)\cos\phi - (L_y + y)\sin\phi \sin\theta + l\sin\phi \cos\theta \\ (L_y + y)\cos\theta + l\sin\theta \end{pmatrix} \quad (1)$$

Where, $$A = \frac{L}{-(L_x + x)\sin\phi - (L_y + y)\cos\phi \sin\theta + l\cos\phi \cos\theta}.$$

10. The projector according to claim 6 or 7, characterized in that parameters used for the keystone correction are respectively obtained by assuming that the vertical gradient of a projection angle is $\theta$, the horizontal gradient of the projection angle is $\phi$, the distance between a light source and a display device is 1, the distance between the light source and a screen is L, parameters for a lens moving distance are respectively obtained by assuming that the horizontal moving distance of a lens is Lx and the vertical moving distance of the lens is Ly, and the keystone correcting portion performs image processing according to keystone correction by using that a pixel position (x, y) on the display device and a display position (X, Y) on a screen have the relation of the expression (1)

$$\begin{pmatrix} X \\ Y \end{pmatrix} = A \cdot \begin{pmatrix} (L_x + x)\cos\phi - (L_y + y)\sin\phi \sin\theta + l\sin\phi \cos\theta \\ (L_y + y)\cos\theta + l\sin\theta \end{pmatrix} \quad (1)$$

Where, $$A = \frac{L}{-(L_x + x)\sin\phi - (L_y + y)\cos\phi \sin\theta + l\cos\phi \cos\theta}.$$

\* \* \* \* \*